2,902,508

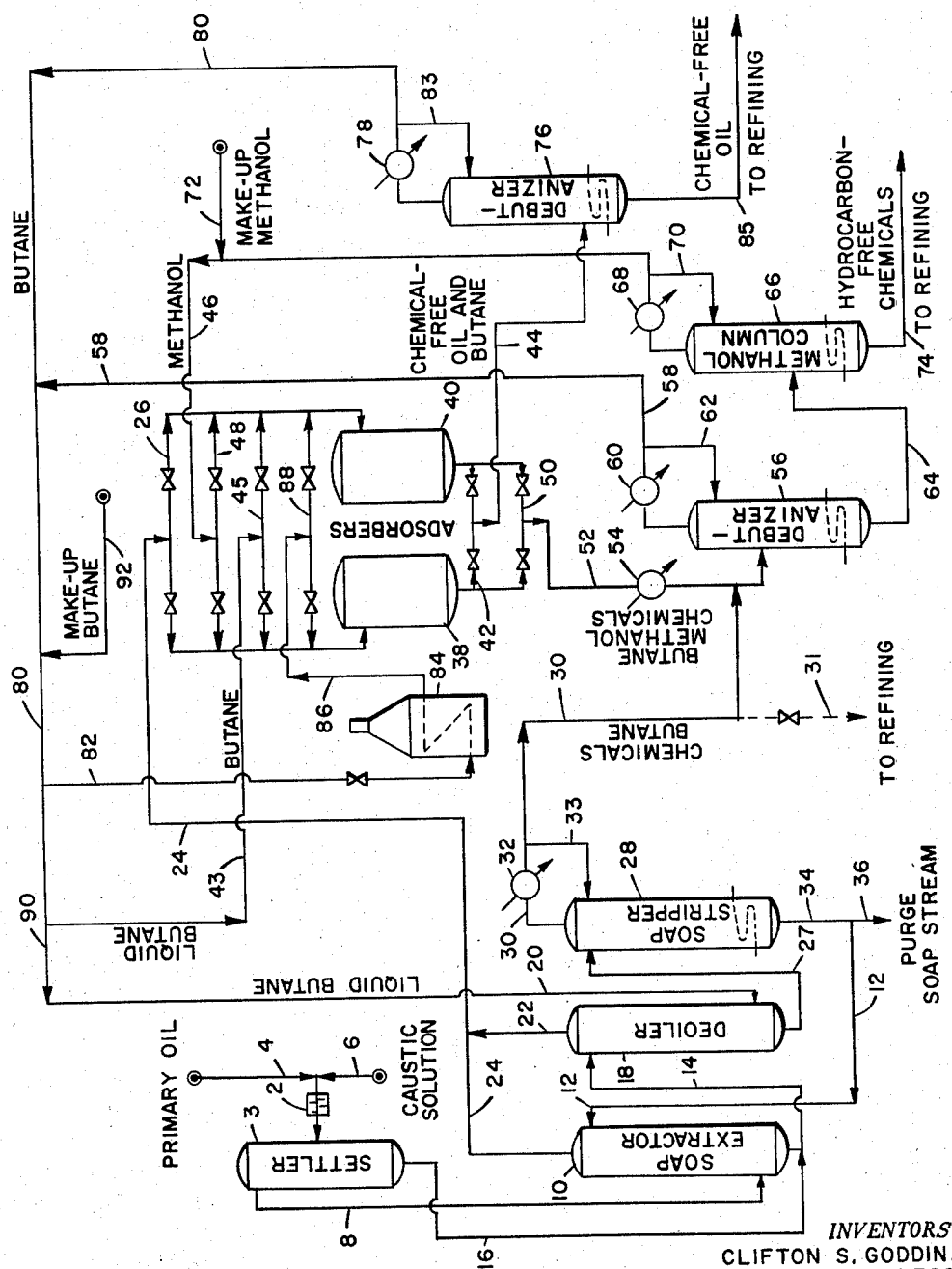

PROCESS FOR RECOVERY OF OXYGENATED CHEMICALS FROM HYDROCARBON SOLUTIONS THEREOF

Clifton S. Goddin, Jr., and James F. Magness, Tulsa, Okla., assignors to Pan American Petroleum Corporation, Tulsa, Okla., a corporation of Delaware Application April 17, 1957, Serial No. 653,387

7 Claims. (Cl. 260—450)

The present invention relates to the recovery of oxygenated organic chemicals from hydrocarbon-containing mixtures. More particularly, it is concerned with the recovery of such chemicals from hydrocarbon mixtures by means of soap extraction and adsorption methods to produce substantially chemical free hydrocarbon streams.

While the principles taught herein find application in the recovery of oil soluble chemicals from numerous crude hydrocarbon mixtures thereof, the present description deals primarily with a novel method for recovering valuable chemicals from oil product streams obtained by the hydrogenation of carbon monoxide in the presence of a fluidized alkali-promoted iron or equivalent catalyst under known synthesis conditions. Also, as will be apparent from the description which follows, the process of our invention may be employed to advantage in obtaining substantially chemical-free hydrocarbon streams containing high concentrations (ca. 80%) of olefins suitable as feed for "Oxo" or other chemical syntheses.

The oil fraction produced in the now generally known modification of the Fischer-Tropsch synthesis has a significant content of chemicals, such as acids, ketones, aldehydes and alcohols, together with a relatively small proportion of esters. For example, in a hydrocarbon synthesis plant designed to produce 6,000 barrels per day of liquid hydrocarbons, there are produced about 320,000 pounds per day of oil soluble chemicals. The distribution of these chemicals in the oil stream breaks down as follows: 100,000 pounds of carbonyl compounds, 100,000 pounds of alcohols, 90,000 pounds of acids and 30,000 pounds of esters. Owing to their value as chemicals, it is desirable to separate these oxygenated compounds as completely as possible from the oil stream. Also, in the subsequent utilization of the olefinic hydrocarbons for chemical syntheses, it is imperative that these oxygenates be removed from the oil to avoid catalyst poisoning or contamination of the products.

In recovering oil-soluble chemicals from hydrocarbon solutions thereof, such as for example, hydrocarbon solutions of the type produced by the reaction of carbon monoxide with hydrogen at elevated temperatures and pressures in the presence of a fluidized alkali-promoted iron catalyst, it has been proposed that aqueous soap solutions of various types be employed as selective solvents or extractants for such chemicals. Generally, these "soap" solutions are not composed of soaps in the true sense, but are made up largely of substantially nonsurface-active salts of alkali metals or equivalent salts derived from carboxylic acid mixtures having an average molecular weight ranging from about 115 to about 155. Soap solutions of this type are most conveniently prepared by adding the required amount of an aqueous solution of caustic, or other suitable base, to the primary oil fraction produced in hydrocarbon synthesis whereby the free acids present in said fraction are neutralized. A substantial proportion of the oil-soluble chemicals, containing about 5 to 10 weight percent of hydrocarbons, is solubilized in the soap solution.

In practice, primary oil from hydrocarbon synthesis was first mixed with sufficient caustic to neutralize the acids in the oil, the resulting soaps forming a lower aqueous phase which separated from the neutral oil. The neutral oil was next extracted with a lean soap solution of the type hereinafter defined and the resulting rich soap extract, which contained oxygenated chemicals and hydrocarbons, was combined with the rich soap formed in the above-mentioned neutralization step. These combined streams were then subjected to extraction with a low molecular weight liquid hydrocarbon, such as for example, liquid propane or liquid butane, for the purpose of removing from the soap solution any hydrocarbons dissolved by the soap in the neutralization and extraction steps. The latter, generally speaking, are undesirable because they tend to impart objectionable characteristics to the chemicals recovered from such solutions. Separation of the hydrocarbons from the chemicals has been a relatively difficult job since the former boil over substantially the same range as the chemicals, making ordinary distillation separation methods of very little value. This hydrocarbon removal step is hereinafter referred to as "de-oiling" or the "de-oiling step." The raffinate from the de-oiling step consisted chiefly of a hydrocarbon-free soap solution containing oxygenated organic chemicals and was thereafter fractionated under pressure to separate the light hydrocarbon solvent present, after which the soap solution was stripped free of chemicals in a conventional bubble cap still. The light hydrocarbon extract obtained from the de-oiling step contained both high molecular weight hydrocarbons and relatively high molecular weight chemicals, particularly ketones and esters, and was generally sent to a distillation column where the light hydrocarbon solvent, e.g., butane, was removed overhead and returned to the de-oiling step. The bottoms from the butane recovery step, consisting principally of hydrocarbons and heavy chemicals, usually was recycled and combined with the neutral oil feed to the soap extraction step.

The separation of mixtures of the type contemplated herein is an extremely difficult technical problem which has been explored for a number of years by many investigators. Although some of the methods developed appear to have promising commercial possibilities, none of them has met with unequalified success. For example, all types of oxygenated organic compounds have been removed from hydrocarbon solutions by contacting the latter with an adsorbent solid, such as activated alumina, silica gel or the like, after which the oxygenated compounds are recovered from the adsorbent by steam distillation or by elution with a polar solvent (such as methanol) followed by displacement of the eluting agent by means of fixed gases or light hydrocarbon vapors. Such methods involving selective adsorption, particularly the batch processes, for the most part, have been relatively costly owing to the requirement of large adsorption vessels, complicated piping and timing mechanisms, and high investment in intermediate storage facilities.

Accordingly, it is an object of our invention to provide an improved process for effecting separations of the above mentioned type by the integration of conventional soap extraction and adsorption methods, said process effecting substantial savings in investment costs. It is another object of our invention to provide a method for separating oxygenated chemicals from hydrocarbon solutions thereof under conditions which favor a prolonged life of the adsorbent material used in recovering said chemicals. Another object of our invention is to employ conditions such that contamination of the eluting agent used in that portion of our process involving selective adsorption, is held to a minimum, thereby simplifying and reducing the cost of the equipment required for recovery and purification of the eluting agent.

Briefly, a preferred embodiment of our invention is carried out by first extracting a hydrocarbon solution of oxygenated chemicals, such as for example, the neutral oil obtained by reduction of carbon monoxide with hydrogen in the presence of a fluidized iron catalyst, with an aqueous soap solution of the type referred to above. The concentration of this soap solution may vary from about 20 to 50 weight percent. However, we prefer soap concentrations of about 35 to 40 weight percent. The soap-to-oil ratio and number of extraction stages are preferably adjusted to give a chemical removal of from about 50 to 80 weight percent. While the soap-to-oil ratio employed to obtain such results may vary, we generally prefer to use from about 1 to 2 volumes of soap per volumes of soap per volume of oil. In carrying out the extraction process, the extraction column preferably should contain from about 50 to 80 actual plates.

The resulting rich soap extract is then extracted with a suitable low molecular weight hydrocarbon, such as for example, liquid propane or butane, to remove traces of dissolved higher molecular weight hydrocarbons from the soap extract. The oil-free rich soap extract is thereafter stripped to recover the light hydrocarbon and chemicals, leaving the lean soap solution for reuse. Raffinate oil from the original soap extraction step and liquid light hydrocarbon extract from the de-oiling step are combined and sent to adsorbers filled with a suitable solid adsorbent material, such as for example, silica gel, for recovery of the remaining heavy dissolved chemicals. This selective adsorption step usually is carried out at about 70° to 100° F. and is accomplished by the following sequence of operations:

(1) When the adsorbent is saturated with chemicals, the oil flow to one adsorber or a particular group of adsorbers is diverted to a second adsorber or group of adsorbers. The oil retained in the first adsorber is then displaced with a low molecular weight hydrocarbon, such as for example, butane, the latter being in the liquid phase.

(2) Residual butane and chemicals held by the adsorbent are displaced by a suitable eluting agent, such as a low molecular weight polar chemical, for example, methanol.

(3) The eluting agent is next desorbed and the adsorbent reactivated by passing hot hydrocarbon vapor, such as butane vapor, through the bed at temperatures from about 200° to 325° F.

(4) The light hydrocarbon from step one and oxyraffinate oil are accumulated and subsequently flashed to recover the light hydrocarbon as overhead. The bottoms fraction, which is now free from both oxygenated compounds and low boiling hydrocarbon, consits essentially of $C_5$ and higher olefins. This latter fraction is well suited as feed to processes for conversion of olefins to chemicals.

The size of the adsorbent beds and the flows of light hydrocarbon and eluting agent are proportional to the amount of chemicals adsorbed from the oil. By installation of soap extraction equipment to remove from about 50 to about 80 weight percent of the chemicals, prior to passing the raffinate oil over the adsorbent, the size of the adsorption equipment, as well as associate equipment for recovery of light hydrocarbon and eluting agent, can be substantially reduced. Owing to the comparative simplicity of the soap extraction equipment and also to unexpected additional advantages from combining the soap extraction and adsorption processes, the savings in adsorption equipment and operating costs render the process of our invention economically attractive.

For a better understanding of our invention, reference is made to the accompanying flow diagram in which, for example, the primary oil phase from hydrocarbon synthesis is introduced into mixer 2 through line 4. Sufficient sodium hydroxide in the form of a 17 weight percent aqueous solution is added to mixer 2 through line 6 to neutralize the acids in the primary oil. The neutral oil is withdrawn from settler 3 through line 8 and charged to extractor 10 where it is countercurrently extracted with a lean 25 to 50 weight percent, preferably 35 to 40 weight percent, aqueous soap solution supplied through line 12 and derived from a subsequent operation discussed below. Soap extract is taken from the bottom of extractor 10 through line 14 and after combination with the rich soap in line 16, formed in the aforesaid neutralization step, is sent to de-oiling unit 18 where it is washed with liquid butane added through line 20 under a pressure of from about 50 to 60 p.s.i. and at a temperature of about 100° F. By this operation high molecular weight hydrocarbons dissolved in the soap are removed therefrom through line 22 and join raffinate oil flowing from extractor 10 through line 24. In this manner installation of a debutanizer column normally required to recover butane from stream 22 is avoided. These combined streams then continue through line 24 to adsorber manifolding equipment 26. Processing of these mixed streams from this point on will be described in detail below.

A rich soap solution containing chemicals, together with a relatively small quantity of butane, but substantially free from high molecular weight hydrocarbons, is taken from the base of de-oiling unit 18 through line 27 and charged to soap stripper 28. An aqueous distillate of oil soluble chemicals is taken overhead through line 30 and condenser 32 and further processed in accordance with a procedure to be specifically described later. The aqueous layer from the overhead is returned to the stripper 28 through line 33. The bottoms from soap stripper 28 consists essentially of lean soap solution and is withdrawn through line 34. A portion of this stream is recycled to extractor 10 via line 12 and the balance is removed from the system through line 36 as a net soap make which may be sent to a suitable acid plant where the corresponding carboxylic acids are recovered. The quantity of soap removed from the system by means of line 36 is equivalent to that introduced into the system via the neutralization step through line 16.

Referring again to the mixture in line 24, said mixture is directed by manifolding equipment 26 downwardly through the adsorbers. Purified hydrocarbons, which are primarily olefinic, together with butane wash, emerge free of organic oxygenated compounds, from the base of adsorption column 38 or 40 through exit manifold 42 and line 44. Flow of charging stock from line 24 through one adsorption column or through one group of such columnns is continued until the adsorbent is saturated. Then the flow of charge stock is diverted to another adsorption column, or group of columns, similarly packed with adsorbent. After flow of charge stock to adsorbers 38 or 40 is discontinued, liquid butane in line 43 is introduced into inlet manifold 45 and eventually into the adsorption column to which the flow of said charge stock has been halted. The downward flow of liquid butane through the last mentioned adsorption column serves to remove heavy hydrocarbons present on the adsorbent, resulting in a liquid butane solution of said hydrocarbons being withdrawn via exit manifold 42 and line 44. This mixture is then separated in debutanizer 76 in accordance with the procedure described below. The liquid eluting agent is led by way of line 46 and inlet manifold 48 through the column or columns, which have just been washed with liquid butane, to remove adsorbed organic oxygenated compounds therefrom as a step in regeneration of the solid adsorbent. For this purpose, a polar liquid, such as methanol, acetone, ethanol, the methanol-acetone azeotrope, or the like, may be used, The enriched eluting agent (methanol) is withdrawn through exit manifold 50 and contains both dissolved butane and eluted chemicals. From manifold 50 this mixture is taken through line 52 and combined with chemicals and butane in line 30, thus making up the feed passing into debutanizer column 56. In this manner column 56 performs the function of two debutanizer columns which would be required if these two separation schemes were not integrated in accordance with our invention. From column 56 a stream of liquid butane is taken overhead through line 58 and cooler 60. A portion of this overhead is returned through line 62 to the column as reflux. The bottoms withdrawn from debutanizer 56 through line 64 contains oil soluble chemicals and methanol free of hydrocarbon contaminants. This stream is sent to methanol fractionating column 66 where methanol is taken overhead through condenser 68 and line 46. A portion of the resulting condensate in line 46 is returned through line 70 to the column as reflux. Make-up methanol is added to the system when needed via line 72. In the event the methanol in line 46 becomes contaminated with relatively low molecular weight chemicals to such an extent that said chemicals interfere with the ability of methanol to function properly in the aforesaid elution step, a portion, such as for example, about 15 percent of the stream in line 46 may be diverted and purified in accordance with any of several well-known procedures, such as for example, by extractive distillation with water. The methanol thus purified may then be returned to the system. The bottoms fraction in column 66 is withdrawn through line 74 and includes the total hydrocarbon-free oil soluble chemical production. This stream may, if desired, be sent to further refining and separation equipment.

The chemical-free oil and butane present in line 44, referred to above, are sent to debutanizer column 76 where butane is separated overhead through cooler 78 and line 80. A portion of the resulting condensate is returned to the column as reflux through line 82. Chemical-free oil, suitable for fractionation of olefin cuts, is taken from the base of debutanizer 76 through line 83. Butane in line 80 is then combined with butane in line 58 and continues to flow through line 80 until line 85 is reached, at which point a portion of the butane is sent through heater 84 and the resulting hot butane vapors taken through line 86 to inlet manifold 88 where said vapors are then directed into adsorption column 38 or 40. Gaseous butane as it enters the adsorption column is at a temperature of about 200–325° F. Such temperature is necessary to remove the eluting agent from the solid adsorbent. Under these conditions the adsorbent is regenerated and is ready for a new adsorption cycle. Butane and eluting agent emerge through exit manifold 50, passes through line 52 and the temperature of this stream is lowered to about 70° to 80° F. in cooler 54. Thereafter, this stream is processed in accordance with the procedure already described.

A portion of the liquid butane is diverted through line 43, as previously mentioned. The remaining liquid butane in line 90 is then conducted to de-oiling unit 18 and employed under conditions previously described. Make-up butane may be added to the system as required through line 92.

From the foregoing description and flow diagram it will be evident that a number of distinct advantages are afforded by the process of our invention. The primary advantage of our integrated process is that the major portion of the oil soluble chemicals is removed by the relatively inexpensive soap extraction technique, thereby markedly reducing the cost of the comparatively expensive adsorption technique used for final clean up of chemicals from the oil. By integrating the two processes, certain unexpected additional advantages also resulted. For example, the investment in soap extraction plant equipment is less than might normally be expected since it is possible to integrate both the extraction and adsorption processes. One particular advantage resulting from the integration is the combination of the rich butane in line 22, as shown in the drawing, with the hydrocarbon raffinate in line 24. By combining these streams in this manner and treating them as shown herein, the butane recovery column normally required for processing the rich butane stream in the conventional soap extraction method can be eliminated. Also, by combining the heavy hydrocarbon-free chemical extract in line 30, which contains dissolved butane, with the stream in line 52 containing chemicals, butane and methanol from the adsorbers; it is possible to eliminate a second debutanizer column which would be required in the separate conventional soap extraction process.

A still further advantage results from the process of our invention, since the soap extraction process preferentially removes from the neutral oil the lighter chemicals having higher polarity and which are also more strongly adsorbed by the silica gel or other material used in the adsorption step. By removal of this class of chemicals from the oil prior to contacting the latter with adsorbent material, it is indicated that desorption of the remaining heavier, less polar chemicals from the adsorbent can be accomplished with less rigorous conditions. This should result in substantial savings due to prolonged life of the adsorbent.

A still further advantage of our invention resides in the fact that while the adsorption process by itself produces the oil soluble chemicals in a single stream, the combined processes as taught herein can be modified to produce two chemical streams that can be separately refined. Such modification is contemplated in the aforesaid drawing by diverting the chemicals in line 30 through line 31 to further refining instead of their addition to debutanizer 56. This withdrawal of the lighter, alcohol-rich soap extracted chemicals makes possible economies in the subsequent purification and separation of the adsorbed oil soluble chemical stream withdrawn from the system through line 74. In addition, the production of these two separate chemical streams tends to minimize contamination of the eluting agent with lighter oxygenated chemicals, thereby rendering purification of the recycled eluting agent less difficult. Thus, in instances where all of the oil soluble chemicals originally present in the neutral oil are fed to column 66 through line 64, it ordinarily is preferable, as previously mentioned, to divert a portion of the overhead in line 46 to a separate purification system in order to prevent buildup of undesirable impurities in the eluant. On the other hand, when the lighter soap-extracted chemicals are diverted through line 31, little or no processing may be required to maintain purity of the recycled eluting agent.

From the foregoing description it will be apparent to those skilled in the art that numerous modifications may be employed in carrying out the process of our invention without departing from the scope thereof. For example, instead of using the adsorbent in the form of a fixed bed it may be used to advantage as a fluidized bed.

We claim:

1. In a process for recovering oil soluble oxygenated chemicals from a hydrocarbon solution thereof by extracting said solution with an aqueous solution of a substantially nonsurface-active salt of a preferentially oil soluble carboxylic acid to obtain a raffinate hydrocarbon stream (1) containing oxygenated chemicals and a salt extract (2) rich in said chemicals and containing minor amounts of dissolved hydrocarbons, thereafter contacting extract (2) with a liquid low molecular weight paraffin hydrocarbon to obtain a raffinate (3) consisting essentially of an aqueous solution of said salt, said chemicals and a minor amount of said low molecular weight hydrocarbon and an extract (4) containing principally hydrocarbons and a minor amount of said chemicals dissolved in said low molecular weight hydrocarbon, and thereafter subjecting raffinate (3) to distillation to obtain an overhead (5) of said chemicals and said low molecular weight hydrocarbon, the improvement which comprises combining raffinate (1) with extract (4), contacting the resulting mixture with a solid adsorbent material in an adsorption zone whereby said chemicals in said mixture are selectively adsorbed on said material, withdrawing a substantially chemical-free stream of said raffinate hydrocarbons and low molecular weight paraffin hydrocarbon, washing the resulting adsorbate with a liquid low molecular weight paraffin hydrocarbon, thereafter, removing adsorbed chemicals from said material by contacting the latter with an eluting agent higher boiling than said low molecular weight hydrocarbon, thereafter removing said eluting agent from said material by contacting the latter at a temperature between about 200° and about 325° F. with vapors of said low molecular weight hydrocarbon, withdrawing a mixture of said chemicals, eluting agent and low molecular weight hydrocarbon from said zone, combining said last mentioned mixture with overhead (5), thereafter subjecting the resulting mixture to distillation to obtain an overhead (6) consisting essentially of said low molecular weight hydrocarbon and a bottoms of said eluting agent and chemicals, and subjecting said bottoms to further distillation to obtain said eluting agent overhead and a bottoms stream consisting essentially of hydrocarbon-free chemicals.

2. The process of claim 1 in which the low molecular weight hydrocarbon employed is butane and the eluting agent employed is methanol.

3. The process of claim 1 in which the adsorbent material employed is silica gel.

4. The process of claim 1 in which the low molecular weight hydrocarbon employed is propane.

5. The process of claim 1 in which said nonsurface-active salt is derived from an alkali metal.

6. The process of claim 1 in which said hydrocarbon solution of oxygenated chemicals is derived from the reduction of carbon monoxide with hydrogen in the presence of a hydrocarbon synthesis catalyst.

7. The process of claim 6 in which an iron hydrocarbon synthesis catalyst is employed.

References Cited in the file of this patent

UNITED STATES PATENTS

| | | |
|---|---|---|
| 2,529,624 | Murray | Nov. 14, 1950 |
| 2,762,830 | Barnard | Sept. 11, 1956 |